(12) United States Patent
Ciccone, Jr. et al.

(10) Patent No.: US 6,338,149 B1
(45) Date of Patent: Jan. 8, 2002

(54) CHANGE MONITORING SYSTEM FOR A COMPUTER SYSTEM

(75) Inventors: Lawrence T. Ciccone, Jr., Pittsburgh; Thomas M. Camden, Jr., Apollo; Duane E. Altman, Pittsburgh; Charles F. Fuller, White Oak; Harold J. Kopp, Harrison City; Gwen Thee, Pittsburgh, all of PA (US)

(73) Assignee: Westinghouse Electric Company LLC, Pittsburgh, PA (US)

( * ) Notice: Subject to any disclaimer, the term of this patent is extended or adjusted under 35 U.S.C. 154(b) by 0 days.

(21) Appl. No.: 09/126,789

(22) Filed: Jul. 31, 1998

(51) Int. Cl.[7] .................................................. G06F 11/00
(52) U.S. Cl. ........................................................ 714/38
(58) Field of Search .............................. 714/37, 38, 47; 709/221, 224

(56) References Cited

U.S. PATENT DOCUMENTS

| | | | |
|---|---|---|---|
| 4,819,233 A | | 4/1989 | Delucia et al. ................ 371/19 |
| 4,864,569 A | | 9/1989 | DeLucia et al. ............... 371/19 |
| 5,805,897 A | * | 9/1998 | Glowny ........................ 717/11 |
| 6,047,129 A | * | 4/2000 | Frye ............................. 717/11 |
| 6,098,098 A | * | 8/2000 | Sandahl ....................... 709/221 |
| 6,170,065 B1 | * | 1/2001 | Kobata ........................... 714/7 |
| 6,182,134 B1 | * | 1/2001 | Collins ........................ 709/224 |
| 6,202,207 B1 | * | 3/2001 | Donohue ...................... 717/11 |
| 6,205,445 B1 | * | 3/2001 | Tokuyama .................... 707/10 |

OTHER PUBLICATIONS

Catch System Software Changes Quickly, Statepoint, Software Integrity, Monitor, Westinghouse, 2pp., 1997.
CIT Cryptographic Integrity Tool, Version 1.0, Cybersoft Inc., pp. i, 1–15, Apr. 1996.

* cited by examiner

Primary Examiner—Robert Beausoleil
Assistant Examiner—Bryce P. Bonzo

(57) ABSTRACT

A change monitoring system for a computer system includes programs for creating and managing a plurality of templates representative of the computer system. A repository stores the templates. A communications network communicates with plural platforms of the computer system. Programs associate the templates with corresponding ones of the platforms and plural software products of the computer system. Other programs monitor the computer system for changes to the platforms or the software products with respect to the templates.

48 Claims, 7 Drawing Sheets

CHANGE MONITORING SYSTEM FOR A COMPUTER SYSTEM

BACKGROUND OF THE INVENTION

1. Field of the Invention

This invention relates to computer systems and, more particularly, to a system for monitoring changes to a computer system.

2. Background Information

The cost to maintain a network of computers or computational nodes can be quite expensive. Software installed by users or system administrators can disable existing applications. An error in a "rolled-out" product can be devastating to a system help desk when that product is installed on a large number of nodes. Changes to shared libraries can be particularly difficult to identify and relate to a system failure. Users and administrators may also delete files which can disable an application. Furthermore, unauthorized user installation of a product can be the source of disruption in uncontrolled environments.

The number of man-days at risk in the event of an undiscovered quality assurance-related system change is significant. In an unmonitored system, the elapsed time could extend into weeks or months.

The process of upgrading computers to a new level of operating system can take days, and typically requires some level of verification and validation of the installed software products. This process can prove quite costly in terms of manpower and system availability.

Prior proposals provide control by individually testing each computer of a computer system on either an as needed basis or when major system changes have taken place.

In prior computer systems, typical change control activities are described and recorded prior to the system change. The effect of the change to one computer is then tested by the system engineer. If the installation is correct for the current computer, then the change is propagated to other related computers in the computer system.

Quality is a key concern in the nuclear industry, for example. Considerable effort is expended in validating computer programs employed for nuclear design. The computer being used must correspond to a validated computer if the validation is to apply. Repeating extensive validation test suites can be time consuming and require a considerable knowledge base.

Accordingly, there is room for improvement in change control applications for computer systems.

SUMMARY OF THE INVENTION

The present invention provides a change monitoring system which monitors a computer system for changes to plural platforms and plural products of the computer system. In this manner, the quality of a previously validated computer system may be monitored for undesirable changes to its diverse platforms and products.

As one aspect of the invention, a change monitoring system is provided for a computer system having a plurality of platforms and a plurality of products. The change monitoring system includes means for creating and managing a plurality of templates representative of the computer system. A means stores the templates. A means communicates with the platforms of the computer system. A means associates the templates with corresponding ones of the platforms and the products. In turn, a means monitors the computer system for changes to the platforms or the products with respect to the templates.

As a preferred refinement, the platforms include at least one platform having a first operating system and at least one platform having a second operating system which is different than the first operating system. The means for monitoring the computer system includes means for monitoring the first and second operating systems.

Preferably, the computer system includes plural software products installed on the platforms, and the means for monitoring the computer system includes means for identifying the software products which are installed on the computer system. The means for identifying the software products may include means for providing a count of each instance of one of the software products on a different one of the platforms.

DESCRIPTION OF THE PREFERRED EMBODIMENT

Figure 1:
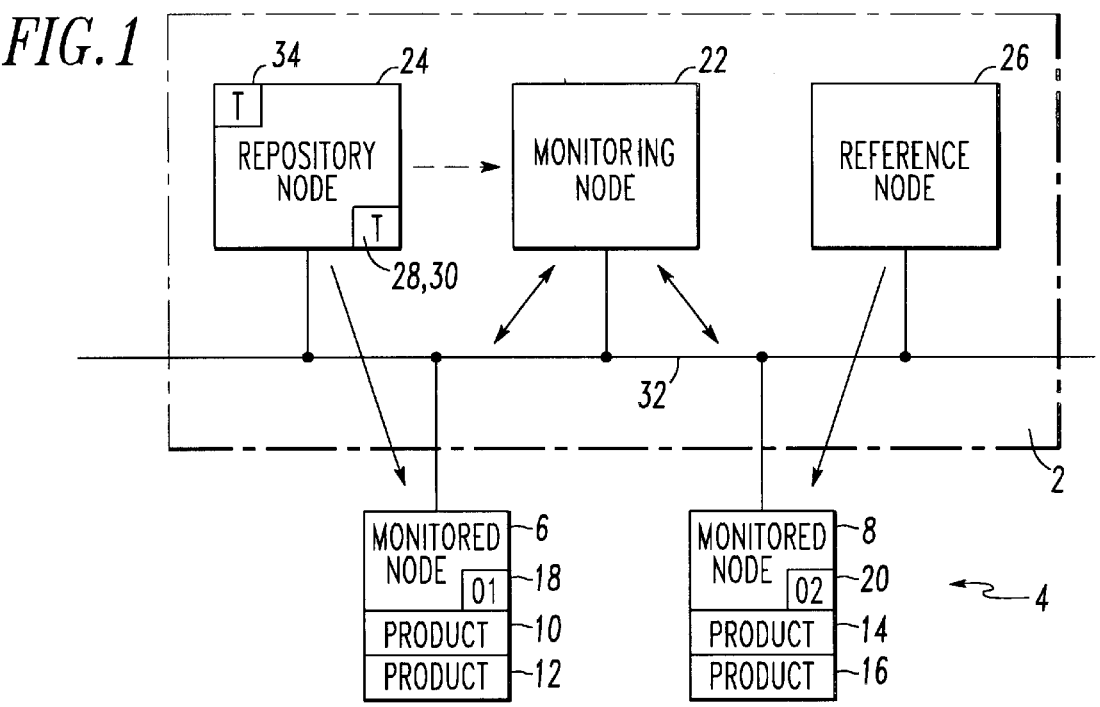
FIG. 1 is a block diagram of a change monitoring system in accordance with the invention.

Referring to FIG. 1, a change monitoring system 2 for a computer system 4 is illustrated. The computer system 4 has a plurality of platforms (shown as monitored nodes) 6,8 and a plurality of products, such as the exemplary software products 10,12,14,16. The exemplary platform 6 employs a first operating system (O1) 18, such as Unix, and the exemplary platform 8 employs a second operating system (O2) 20, such as Windows NT, which is different than the first operating system 18, although a wide range of operating systems (e.g., Windows 95, Windows 98), which may be the same or different in each of the platforms, may be employed.

Although an exemplary computer system 4 is shown, it will be appreciated that a wide range of such systems may be employed (e.g., without limitation, plural node (e.g., from 2 to 1000's or more nodes) systems for diverse applications such as enterprise systems, nuclear design, banking, medical, web server, department systems, engineering, software development, home PC, or other activities in regulated industries or in areas where system change control risk should or must be minimized). While exemplary platforms 6,8 are shown, the invention is applicable to a wide range of platforms (e.g., without limitation, processors, mainframe computers, mini-computers, workstations, servers, personal computers (PCs), as well as other microcomputers, other microprocessor-based computers, central processing units (CPUs) or networked processors which employ an operating system).

The exemplary system 2 includes a monitoring node 22, a repository node 24, and a reference node 26. As will be discussed in greater detail below in connection with FIGS. 2–13, the monitoring node 22 creates and manages a plurality of templates (T) 28,30,34 which are representative of the platforms 6,8 and products 10,12,14,16 of the computer system 4 and which are stored by the repository node 24. The monitoring node 22 associates the templates 28,30,34 with corresponding ones of the platforms 6,8 and the products 10,12,14,16, and, also, monitors the computer system 4 for changes to the platforms 6,8 and/or the products 10,12, 14,16. For example, one template might be for one platform, another template might be for another platform, a further template might be for one product on one or more platforms, and a still further template might be for another product on one or more other platforms. However, as discussed below in connection with FIGS. 3–4, the same template may be employed for the same or similar platforms, or the same product on the same or similar platforms.

The nodes 22,24,26 employ a computer network, such as the exemplary communications network 32, for communicating with the platforms 6,8 of the computer system 4. Although an exemplary communications network is shown, it will be appreciated that any suitable computer network may be employed (e.g., without limitation, token ring, Ethernet, FDDI, any, some or all of which may be configured as local-area networks (LANs) or as wide-area networks (WANs)).

The system 2 is computer system independent in the way it handles monitoring and, hence, may monitor any computer from any computer. From any installation of the system 2 on one or more computers, such as 22, other computers, such as 6 and 8, can be monitored. For example, the exemplary computers in network 32, which links Unix (e.g., Unix platform HP-UX, Solaris, AIX) and Microsoft Windows NT computers, can be monitored easily from a system administrator's desk using, for example, a Hewlett Packard Unix workstation, such as 22. In turn, all computers on the network 32 can be accessed, queried and administered from the administrator's desk.

The system 2 preferably employs a client-server architecture. Once the exemplary system 2 is established on NT and/or Unix based platforms, viewing of each of those platforms' change control status, along with subsequent remedy of problems, can be performed from any platform. For example, central help facility personnel may be on NT platforms and engineering personnel may employ NT and Unix platforms. The system 2 facilitates the administration of all the engineering platforms (NT and Unix) from the central help facility's NT platforms. Conversely, if other support personnel are on Unix platforms, they can monitor the same NT and Unix platforms via the communications network as the central help facility.

The system 2 employs a "template" concept. Typically, the monitoring node 22 (or another node) makes and stores the templates 28,30 of the platforms 6,8 and products 10,12,14,16 as reference states in the repository node 24. The monitoring node 22 copies the applicable templates to the corresponding monitored nodes 6,8. In turn, the monitoring node 22 periodically checks the platforms and products of the computer system 4 to determine whether they match the stored templates 28,30.

Each of templates 28,30 for the products and platforms is a record of the objects that make up a vendor/system product or a grouping of objects that logically need to be monitored. Objects, for example, may be the files, processes, and/or disk storage, that are necessary to successfully operate the product or application. Each of the exemplary software products 10,12,14,16 has a label consisting of the product name and the version number. The templates 28,30 for the products list all of the objects included in that product, the attributes needed to be verified for each object, the expected values of those attributes, and the severity associated with divergence from the expected value. Examples of objects (and their attributes) are: (1) platform (CPU type, operating system version, operating system release); (2) files (path name, owner, group, permissions, size in bytes, CRC, number of links, link resolution); (3) processes (process name, duration of execution); and (4) disk storage (drive, identifier, total capacity, user warning threshold, help desk warning threshold).

The system 2 facilitates the definition of all the platform, software and hardware objects that need to remain unchanged and require monitoring, and, then, verifies, that those objects have not changed. When the system 2 runs a verification, it refers to the templates 28,30 to know which attributes to check and their expected values. It then compares the expected values against the current values on the platforms 6,8. In turn, the system 2 reports and logs any difference found between the template values and the current values.

The scope of a template for an engineering system, for example, depends upon the items that the parent organization considers to be quality-critical. For example, scope may be jointly determined by the quality assurance department and the engineering department. Scope normally includes the operating system, CPU and key applications. Scope may vary, for example, from 42,000 files on a workstation-based computer system that supports nuclear reactor core design to 3,000 files on a personal computer that supports a single type of analysis.

A domain, which is generally well-known in the computer industry, is the highest level of the architecture of the computer system 4. The number of domains defined typically depends on the size of the environment. In a large corporation, for example, there would normally be at least a separate domain for each major business. Domains may also be divided by functional group (e.g., engineering, accounting, personnel). Preferably, domains are assigned upon review of global configuration parameters. In each case requiring different parameters (e.g., location of software repositories, exception report schedules, exclusive change time-out value, remote time-out value, auto-fix capabilities, and user notification options), a new domain should be identified. Although a domain might include a group of nodes within a network structure used to uniquely define their function or organization (e.g., NT Domain A for an engineering department) within the system 4, any domain is possible (e.g., a combination of "NT Domain A" for an engineering department and "Unix Domain B" for an information systems department). The domain of a computer system can be a logical grouping of nodes within a business structure. For example, there may be a master domain at the corporate level with several business unit domains at the next level. Domains may also be defined by physical location, with each site having a unique domain.

Node groups are collections of nodes within a domain and permit additional logical collections under the domain. Node groups are employed by users and administrators to define specific parameters for groups of nodes. Typically, different node types with different requirements are defined as separate node groups. For example, engineering workstation nodes under control may be defined as one node group, and accounting PC nodes with no control may be defined as another node group.

Figure 5:
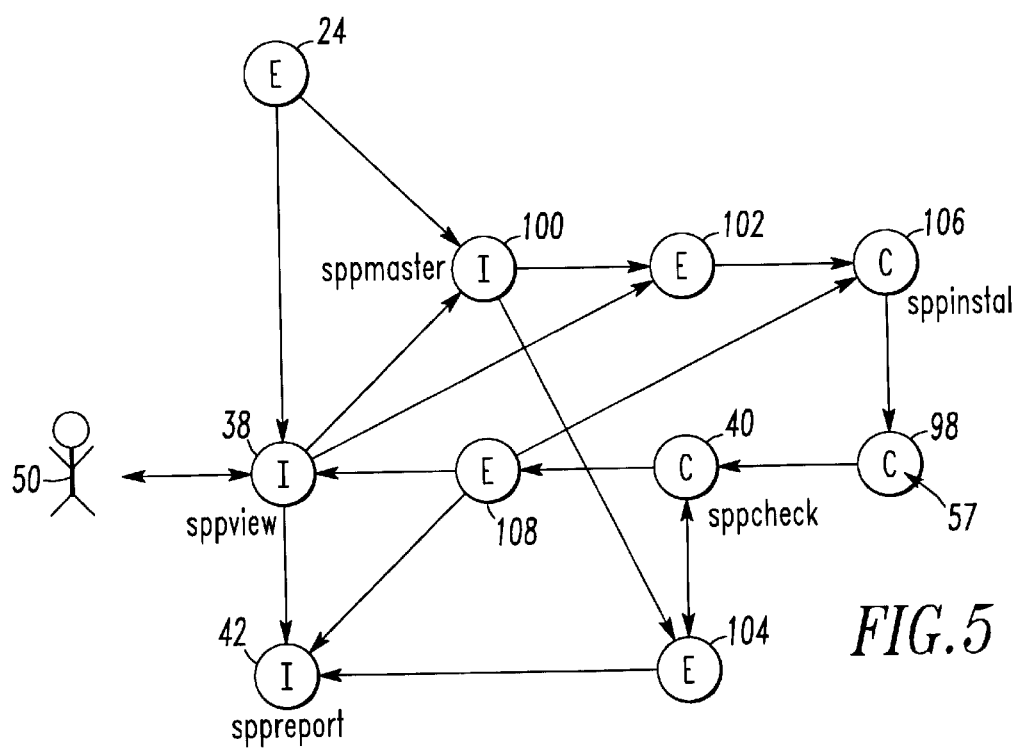

Node groups can be detected by querying the check list (if any), such as 102 of FIG. 5, that is present on each monitored node 6,8.

User groups are collections of user IDs that may have permissions and other parameters defined as a group.

Product groups are logical collections of products that have specific features or requirements in common. For example, an operating system would normally be a product group and, thus, MS Office would be a product group that includes all of the MS Office applications.

One embodiment of the system 2 employs the following exemplary attributes of the platforms 6,8 and their files to form the templates 28,30: (1) platform attributes including operating system name, operating system version, operating system release, and CPU identifier (although "equivalent" CPUs are supported); and (2) file attributes including file name (an existence test is employed), owner (e.g., user ID, group, system), group affiliated with (e.g., system, user), permissions (e.g., who can execute, who can read), size (either a matching size for files that are not to be changed or a maximum threshold size (e.g., a maximum file size in Kbytes for log files that triggers notification when the file exceeds the threshold)), links (i.e., a shortcut (e.g., "/point") to a full file name (e.g., "C:/abc/def/compiler.exe")), and/or a modified cyclic redundancy check (CRC) (e.g., 32 bit, 16 bit), although the invention is applicable to templates which employ a wide range of attributes.

Another embodiment of the system 2 employs other exemplary attributes of the platforms 6,8 to form plural templates 34: (1) Windows NT™ registry entries which are associated with particular applications; (2) services/daemons (e.g., programs which run continuously and, thus, need to be verified to ensure that they are not corrupted, are still running, and not dormant, such as mailbox servers); (3) computer to computer handshaking such as Unix to/from NT data flow; (4) modem servers for dial out; (5) disk quotas (e.g., multiple users are each assigned a quota (i.e., a size limit) for a particular disk drive and, thus, alerts are provided if the quotas are exceeded); (6) disk maps (i.e., is a platform still mapped to another platform's disk drive); (7) disk mounts (i.e., is a particular disk drive still mounted to the platform); (8) environment variables (e.g., paths to .exe files; paths to help pages; variables in a logon session, such as the value "A" is the path to a particular program); (9) file trimming (e.g., if a file exceeds a particular size, then trim a portion or percentage of the oldest information from the file); and/or (10) software inventory functions (e.g., based on the percentage of information which is matched for a particular template, determine the expected revision level of a word processor, such as Word 7.0).

The exemplary templates 28,30 provide file management control, while the templates 34 provide hardware management control. It will be appreciated that applications exist for one or both of these embodiments.

Each of the platforms 6,8 is a combination of hardware and an operating system which creates a unique system environment (e.g., an Intel Pentium, and NT 4.0, Service pack 3). Each unique set of hardware and operating system is an individual platform. Each platform, in turn, contains its templates (e.g., which are downloaded from the repository node 24 for the software and hardware products), product logs, product group lists (e.g., products that have similarities, such as Microsoft Office or pieces of operating systems), and check lists (e.g., groups of products for particular platforms which are used to configure a user node; locations of files employed to reload a user node). Thus, for example, an HP 735 computer with HP UX 9.01 operating system would be a separate platform from an HP 735 computer with HP UX 9.05 operating system. It will be appreciated that a single node having one computer and two (or more) operating systems includes two (or more) platforms.

The hardware is defined by CPU chip (e.g., Pentium) and stepping level (e.g., 1, 2, 3).

The operating system is defined by name (e.g., NT), version (e.g., 4.0) and release (e.g., Service pack 3) which might include various software patches.

The platforms 6 and 8 have a set of product templates for the products 10,12 and 14,16, respectively. This includes all versions of the products that are installed on the node. Although only two products are shown per platform, it will be appreciated that three or more of such products may be employed. Each platform normally also has one or more defined master nodes, such as 26, which contain a clean configuration of that specific platform.

The exemplary system 2 employs four logical node types as illustrated in FIG. 1, although two, three or four of these logical node types, 6/8,22,24,26, may be on one physical platform.

The reference node 26 is where validation is performed and validated programs and data are retained.

The repository node 24 is where the templates 28,30,34 and check lists of products (i.e., the list of products for a particular platform, such as "engineering node", "development node") are maintained. This repository storage is employed for subsequent usage on additional platforms. The system 2 permits the system administrator to create a "replicate" node that is exactly the same as the original platform in everything other than name. When configuration requirements demand that software be run on controlled platforms, this feature is invaluable as software can be verified on one system and then run on any of the replicate nodes.

The repository node 24 defines multiple platforms. In some environments, there may be a single master repository node that keeps the original copies of all of the repositories for all of the domains, and there may also be duplicate repository nodes physically located within each domain that store the repositories for that individual domain. Each repository node has a set of configuration files which define the global parameters for the domain; the templates, such as 28,30,34; and log files for each platform that exists within that domain. The system 2 maintains two types of configuration files. The spp.cfg configuration file specifies options for the various interfaces to the system 2. The node.cfg configuration file specifies information and options, such as default options, for the nodes within a single domain or node group.

The monitored nodes 6,8 are those nodes or platforms on which the user performs quality-critical calculations. The monitoring node 22 is employed, for example, by the help desk person and the system administrator to view and modify the monitored nodes 6,8.

Figure 2:
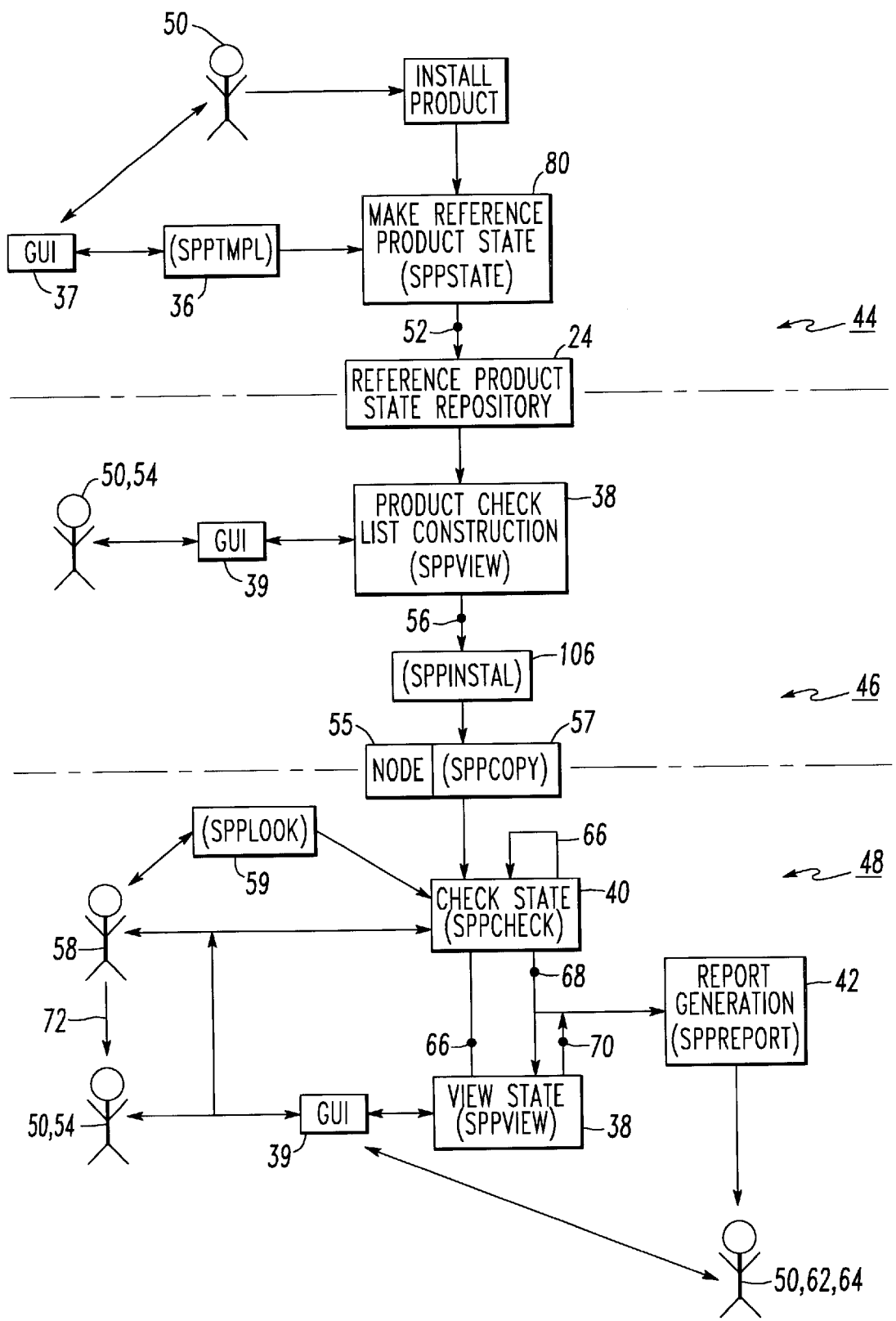
FIG. 2 is a block diagram of various programs of the change monitoring system of FIG. 1.

Referring to FIG. 2, overall data flow for the system 2 of FIG. 1 is shown. The system 2 includes programs spptmpl 36, sppview 38, sppcheck 40, sppreport 42, sppcopy 57, sppstate 80, and sppinstal 106, all of which are accessible by certain users of the system. There are three distinct phases 44,46,48 of use of the system 2. In the product state creation phase 44, a system administrator 50 employs the program spptmpl 36 to define the components of an installed product and its attributes that are to be tested. The values of the attributes determined in this phase 44 serve as the expected attributes when the product is placed onto a production node. The values of the attributes are the reference product state 52 which is stored in the repository node 24.

Preferably, the administrator 50 specifies certain features of the system 2 to be permitted access by each user, with full or significant functions of the system 2 being made available to the users 50,54. Then, any time a system function is accessed, the system 2 checks to determine the access rights of the user. User level definitions determine the authorization levels of specific user IDs. For example, the highest level is the administrator 50, who defines the central architecture. The next level permits corrections to be implemented. The third level is the help desk person 54. Finally, the lowest level is a user 58 who views only limited information of the system 2.

In the node configuration phase 46, the administrator 50 (or help desk person 54) employs the program sppview 38 to identify the products that are to be placed onto a selected node 55, as well as specific actions to be performed on that node such as periodic generation of exception reports. The template 56 including the values of the attributes, as stored in repository node 24, are transferred to the selected node 55 using programs sppinstal 106 and sppcopy 57. The sppcopy program 57 can also be driven externally to add product templates and operate the check list, such as 102 of FIG. 5, on the node 55.

In the monitoring and reporting phase 48, a user 58, administrator 50, or help desk person 54 employ the program sppcheck 40 to identify deviations from the expected product states. Also, the administrator 50 or help desk person 54 employ the program sppview 38 to permit product state modification. Furthermore, the program sppreport 42 provides reports describing the conformance to the expected states to users such as the administrator 50, a new customer 62 who is interested in the quality of the computer system 4 of FIG. 1, or an auditor 64. In this manner, the help desk person 54 (or administrator 50) identifies trends and supports audits by producing reports of system activity regarding one or more nodes.

The administrator 50 provides the information for a single product in the repository 24 whenever a product (e.g., collection of software and/or hardware components) is to be added. This information is the basis for identifying the elements that must be checked to confirm that the product remains unchanged. The administrator 50 may duplicate the state testing configuration on an identical hardware node. After the software installation, the administrator 50 verifies the installation by using the program sppcheck 40 in conjunction with the templates loaded into the selected node 55. Any differences required to match the reference node 26 of FIG. 1 are resolved and documented as discussed below in connection with FIG. 9. A record of the state 66 of the node is made for subsequent use.

The program sppcheck 40 is a key component of the system 2 which diagnoses and corrects defects on a specific node. A defect is a deviation from the expected state. The user 58, help desk person 54, administrator 50, or a daemon may initiate the program 40, after which the revised node state 66 is obtained, errors 68 are logged, and corrective actions 70 are summarized.

The user 58 may invoke the program sppcheck 40, which obtains the platform's quality-assurance revised node state 66 based on the last recheck of the platform. The node state 66 may be diverted to become part of the output of the analysis program sppview 38 and to serve as the quality assurance record for the specific platform. Alternatively, the user 58 may do nothing and rely on the cumulative system log. As another alternative, the user 58 may obtain summary information regarding the current QA state by invoking program spplook 59. That information is often adequate to support an audit in connection with the selected node 55.

Acting upon a call 72 from the user 58, the help desk person 54 manages the node correction process by employing the program sppview 38 to permit product state modification. This case differs from the case discussed below in connection with FIG. 5 (in which the system administrator 50 receives no call), in that the user 58 in FIG. 2 requests help from the help desk person 54 who has authority to correct a wider range of faults than the user 58.

When a fault is detected, the help desk person 54 (or the administrator 50) identifies the problem and takes corrective action. In this case, for example, the administrator 50 may be notified by the system 2 that a problem exists or the help desk person 54 may identify the fault by viewing the test results.

Network monitoring and reporting functions of the system 2 are supported by dialogs that: (1) provide the status of groups of nodes; (2) select a node for detailed scrutiny; (3) identity the state of each product group and/or product on a node; (4) display differences from the reference template; (5) require quality assurance logging of template changes; (6) require quality assurance logging of system changes; (7) display the template in a report format; (8) display summary log reports; (9) display the space available on the disk drive; and (10) display the names of products potentially affected by a shared library. These organize the computer system 4 visually with information on which parts of that system are critical to the function of each product set.

FIGS. 3–13 illustrate flowcharts for programs of the system 2 which preferably employs graphical user interface (GUI) based applications, such as GUI 37 and GUI 39 of FIG. 2. For simplicity of reference, these GUIs are not shown in FIGS. 3–13. The initiators of actions are called actors and are external to the circles of these figures. The letter C, E or I is placed in the center of each object to indicate that the object is primarily: (C) a controlling object (i.e., one that primarily controls and performs functions); (E) an entity object (i.e., one that primarily contains data); and (I) an interface object (i.e., one that primarily acts as an interface to a user), although each object may also perform functions not associated with its primary designation. Lines with arrows between the objects indicate the flow of information, with details regarding the information being passed being discussed below in connection with FIGS. 3–13.

Figure 3:
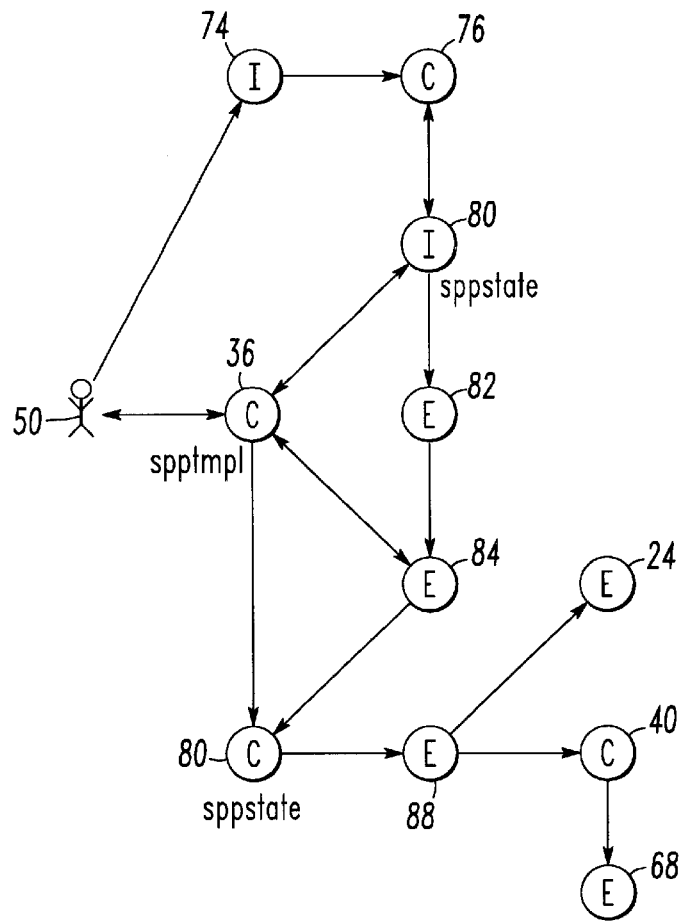
FIGS. 3–13 are flowcharts for the programs of the change monitoring system of FIG. 2.

Referring to FIG. 3, the administrator 50 provides information for a single product in the repository 24 whenever a new product is added, an older product is deleted, or a product is modified (e.g., a major change is made to an operating system, both operating system and hardware are changed simultaneously). The administrator 50 provides the information for a new node or upgrades information for an existing node. This information is the basis for identifying the elements that must be checked to confirm that a product remains unchanged.

Figure 4:
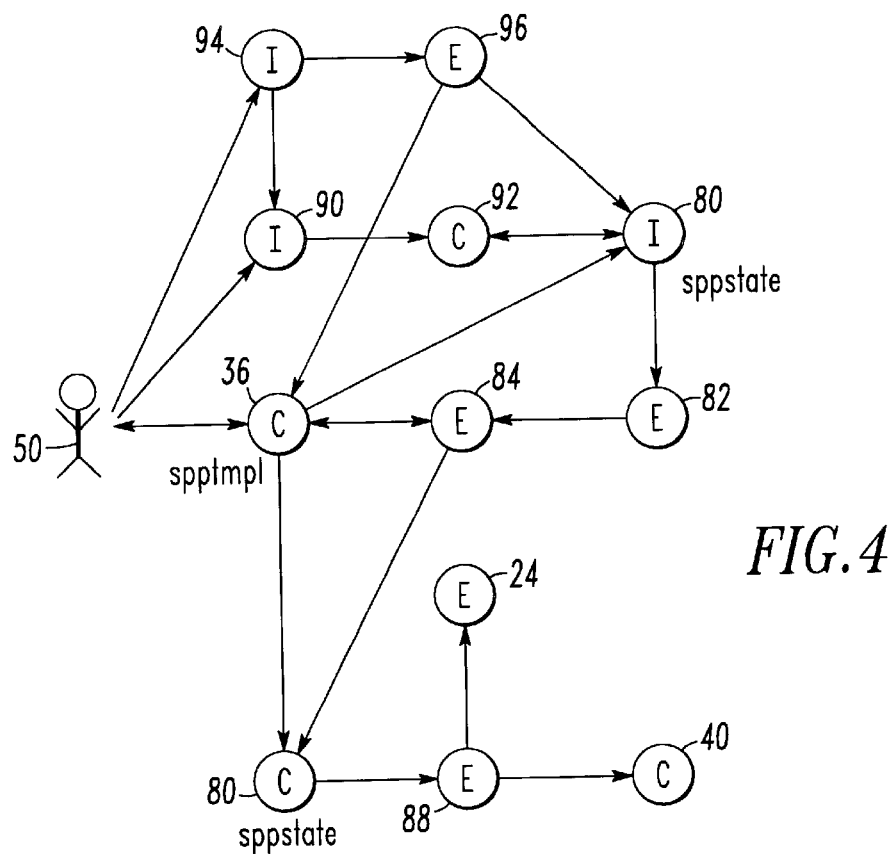

First, the administrator 50 activates the spptmpl program 36 to obtain a snapshot of the node 76 prior to the installation of the product. Next, the administrator 50 executes the installation instructions 74 for the product on the desired node 76 (e.g., software development node, engineering node). Then, the administrator 50 specifies the name of the snapshot which is to be used as the comparison basis. An entry of "none," as discussed below in connection with FIG. 4, is employed for an initial node. The administrator 50 enters the name of the product and the version of the product, and selects the product group name.

In turn, the program sppstate 80 queries the operating system of the node 76 to obtain initial snapshot information about its current state, including the last modified dates/times on all files in designated directories of interest, the names of all processes that are executing on the node 76, and a list of its hardware components That information is recorded in a base level template 82, which is a draft product template.

Then, the administrator 50 interacts with information obtained by the program sppstate 80 to eliminate or deactivate checks not deemed necessary (e.g., checks on "help" manual pages). For example, the GUI 37 (shown in FIG. 2) which is driven by program spptmpl 36 permits the administrator 50 to specify the attributes to be checked, eliminate one or more files (e.g., by suffix or wildcards), move selected files to other templates, and display the templates.

For example, topics that can be added, deleted or modified for software applications are: (1) directories of the platform; (2) files or links, wherein a file name may be replaced by a link to a common storage area, the name of the link is supplied, and files may be specified as "$PREFIXn/ . . . " where "$PREFIXn" is supplied; (3) required processes that must be executing; (4) license servers (i.e., the name of a license server process); (5) shared library references (e.g., file names of shared libraries, wherein dependencies are retained for subsequent correlation to shared library changes); (6) identification of the hardware configuration used for the snapshot; (7) identification of the operating system used for the snapshot; and/or (8) free disk space required for the installed product Each product on the computer system 4 of FIG. 1 is shown by its product name in the GUI 37 of program spptmpl 36 of FIG. 2. These product names may be associated into a higher level grouping. The system 2 automatically generates those objects associated with a product and incorporates monitoring of that product into the system 2. As in platform monitoring, as discussed below in connection with FIG. 5, each product can be interrogated to find defects by employing either a fast-recheck or a full-recheck, as appropriate, at the product level. When a product change is detected, the system 2 assists in "drilling down" into the product to determine the problem.

The operating system is described, for example, by the following named groups: (1) changeable (i.e., files expected to be different); (2) base (i.e., files expected to be identical); and (3) shared libraries (i.e., files known to be used by multiple applications).

The severity level of various types of faults (e.g., for each object and/or object attribute of interest) may be specified by product or by element. The corrective actions, the conditions that need to be tested prior to a corrective action, and the permission level required to perform a corrective action may optionally be specified.

Upon committal by the administrator 50, both the base template 82 and the modified template 84 are retained in the repository 24 along with the name of the author, the time stamp for template creation, and the description of the template modification. A state file 88 for the specific product is created by program sppstate 80 and is also stored in the repository 24. The state file 88 is also checked by the program sppcheck 40 with the resulting error log 68 being generated as a QA record.

The templates, such as 84, may either be built all-at-once or else incrementally. In some cases, it may be convenient to construct an initial template and then modify it incrementally as new, tested products are added. In cases where a platform has been validated, but its origin is murky, the all-at-once approach may be used. Both approaches are available in the framework of the system 2 and the administrator 50 can select an approach that is appropriate for the circumstances.

As shown in FIG. 4, which is somewhat similar to FIG. 3, the administrator 50 provides information 90 for a new platform 92 which consists of a new operating system and/or new hardware. This occurs, for example, when a major change is made to the operating system and/or when both operating system and hardware are changed simultaneously.

First, the administrator 50 uses tools 94 provided by the product vendor to identify the products. The tools 94 and product dependencies are different for each platform and may be different for each product. Product identification and product dependency data 96 are, then, obtained from the tools 94. This data is employed by the running program spptmpl 36 and may be employed by the program sppstate 80. The administrator 50 enters "none" for the requested snapshot name and, upon confirmation by the administrator 50, the program sppstate 80 creates one or more base product template(s) 82.

The program sppstate 80 queries the operating system of the platform 92 for information about its current state. Differences in executing process names are used to identify added processes. Also, differences in hardware are identified. Any derived base template 82 is saved to be added to the QA report and for possible later re-use.

Then, the administrator 50 generally follows the same process used for a single product (see FIG. 3) and interacts with information obtained by the program sppstate 80 to eliminate or deactivate certain checks not deemed necessary, and to set the severity for the remaining checks. In contrast, this present activity of FIG. 4 involves many more components and, thus, is much longer in duration. Different or additional topics that can be added, deleted or modified for software applications are: (8) free disk space required for the execution phase of a product; and (9) mount/attach (i.e., a file system must be present for this application).

Also, the administrator 50 may specify the following additional topics: (10) disk quotas (i.e., disk quota by user); (11) runaway processes and time limit (i.e., processes no longer having a parent or those that have been active for longer than the time limit); (12) network binding (i.e., assurance that nodes acting as servers are available); (13) time synchronization (i.e., specification of a reference node for time synchronization); (14) operating system version (i.e., the expected operating system version); (15) rules for time limited processes; and (16) queue capacity (e.g., full print queues). The administrator 50 may further specify named hardware configurations, as follows, via a separate GUI sub-menu: (1) processor availability; (2) RAM; and (3) disk capacity (not shown).

Corrective actions, the conditions that need to be tested prior to a corrective action, and the permission level required to perform a corrective action may optionally be specified. The severity level of various types of faults may be specified by product or by element. Also, a notification to users of the affected platform, and to the administrator 50 regarding a fault, may be specified by product or by element. Default severity levels are provided by object type. The remainder of FIG. 4 is as discussed above in connection with FIG. 3.

Referring to FIG. 5, the administrator 50 specifies a new configuration for a node 98. First, the administrator 50 specifies through the GUI 39 (shown in FIG. 2) of program sppview 38 that a new node configuration is to be constructed and selects a customized product set, in terms of "hardware," "operating system," and "applications". Previously named groups of applications, or the product set on any node as defined from the repository 24, may be employed as a starting point. The GUI 39 also supports assigning access rights to users of the system 2 for the node 98, as well as node specific information such as network server names, license server names, and the schedule for execution of the program sppcheck 40.

Next, the program sppview 38 causes program sppmaster 100 to construct a check list 102 and a reference state 104 for the new node 98. Then, the administrator 50 enters the new node name and initiates the install program sppinstal 106 through the GUI 39 which is driven by program sppview 38. Program 106 and program sppcopy 57 of FIG. 2 employ the check list 102 to copy templates and all of the product reference state files specified by list 102 to the node 98 along with appropriate system 2 programs, such as the program sppcheck 40.

Figure 6:
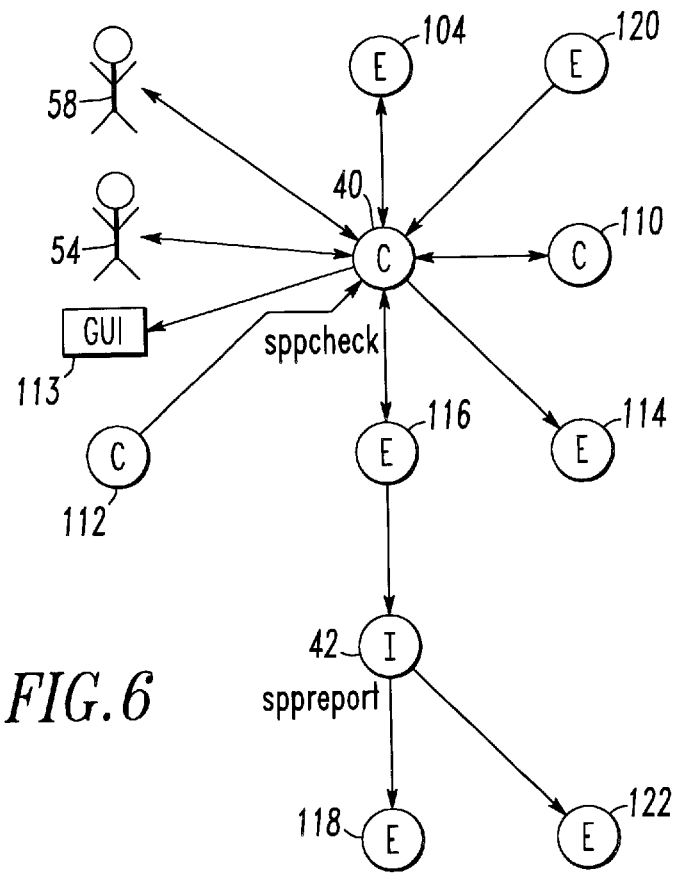

When executed, the program sppcheck 40 generates change data for those files that are expected to be different and places this data into a node specific log file 116 (shown in FIG. 6). Also, the program 40, which is driven by the check list and templates copied to the new node 98, checks the state of each element and confirms that the installation matches the expected state attributes.

Next, the administrator 50 employs the program sppview 38, reviews the results for any differences in products (e.g., various compilers) as set forth in its GUI 39, and takes any necessary corrective action as discussed below in connection with FIG. 9. Finally, the administrator 50 initiates the generation of quality assurance records by program sppreport 42 through the GUI 39. Data from a node specific state reference file 108 and reference state 104 are assembled into a report (e.g., file output with an option for paper output) as discussed below in connection with FIG. 13.

FIG. 6 shows the program sppcheck 40 which diagnoses and corrects defects on a specific node 110. Briefly, a defect is a deviation from an expected state of the node 110. For example, the user 58, the help desk person 54 or a daemon 112 may initiate the program 40 which obtains the current state 114 of the node 110. Finally, errors are logged in the error log file 116 by program 40 and corrective actions are summarized in a report 118 by program sppreport 42.

Log files, such as 116, record all pertinent information on a node including system changes and administrator activities. A state.log file is updated after each function of the system 2. System activities can include, for example, checking of a platform on a scheduled periodic or on an on-demand basis, and an administrator's resolution of detected failures. Types of information included in the state.log file are: (1) installation activity; and (2) each product's verification time and status, and deviations from template values. A product.log file is updated when a change is made to a specific product. Types of information included in the product.log file are: (1) template change information; (2) file replacement information; and (3) explanations of changes.

First, the program sppcheck 40 is executed by the user 58 or the help desk person 54 on an on-demand basis, or the daemon 112 on a periodic basis. The user 58, who may be allowed to access limited correction capability, may specify the product name, the time at which the program 40 is to be run, a list of objects to check, whether corrections are to be provided, and if the check is to be stopped. This supports both periodic as well as non-periodic, on-demand tests to confirm certain products with respect to the stored templates. The help desk person 54 may be allowed to access the full range of corrective capability and may specify testing with file CRC checks and/or testing for a specific product. The daemon 112 may periodically perform a full test in order to demonstrate the stability and sameness of the selected node 110. The daemon 112 is restricted to the same level of corrective action that is permitted for its initiating user.

In particular, a user may specify that: (1) only certain products are tested, with the default being to test all products that have been installed on the selected node 110; (2) only certain object types (e.g., (a) file names and links, (b) required process names, (c) license servers, (d) replaceable file mount/attach/map, (e) data quotas, (f) time synchronization, (g) network servers, (h) runaway processes, (i) time limited processes, (j) hardware configuration, (k) operating system configuration, (l) network binding, (m) node CPU availability/Xterm availability, and/or (n) disk capacity) are tested, with the default being all types except CRC testing (and security on NT systems); and (3) file CRC testing is to be bypassed, which is the default and improves performance significantly, but is less rigorous.

The on-demand fast-recheck test quickly checks (e.g., taking seconds) a platform's status and, also, provides a more thorough check capability depending on the need. The fast-recheck capability checks all object attributes with the exception of the object contents. This provides a quick first level interrogation of the computer system 4 to determine any attribute changes. Also, when the help desk person 54 needs to resolve a specific problem, there is the option of verifying only a single product within the computer system 4 and saving the time it would take to verify that entire computer system.

The program sppcheck 40 employs a state check list 120 which identifies each object to be checked. The program 40 performs a test on each of those objects by querying the node 110 to determine whether the original state of an object, such as a file owner name as set forth in the template, has changed to some modified state, to thereby determine if, when and how a product was modified (e.g., what objects and attributes changed, when they changed, and how they were changed).

If a defect exists, then a decision to attempt a correction of the node 110 is made. Either the object in the list 120 contains the criteria to attempt a correction or else the object itself contains the criteria. However, no corrections are attempted unless the user specifies this and has the necessary authority. If that decision to attempt correction is positive, then the correction of the node 110 is attempted (e.g., a re-installation of an affected file to its original state as defined by the reference node 26 of FIG. 1).

Next, the program 40 tests to determine if the correction to the node 110 was successful. The program 40, then, logs faults, corrective actions and consequences to the log file 116, and sends predefined mail messages to the user 58, the help desk person 54 and/or the administrator 50 (shown in FIG. 2) to notify them that certain problems exist. For example, when new node configurations are constructed, the administrator 50 can specify who is to be notified for certain types of failures that have not been corrected.

Next, the program 40 compares the current state of each object attribute with the corresponding predefined expected value and, then, employs that information and the corresponding severity value to determine the current node state 114 for the node 110. The templates 28,30,34 of FIG. 1 include a list of expected values and severity values for the values of the object attributes. The severity values are associated with divergence of a corresponding value from a corresponding expected value. The program 40 compares the current values of the attributes with the expected values of the list and identifies each of the attributes and its corresponding severity value for each instance of divergence. In turn, each instance of divergence for the node 110 is reviewed and the worst case severity value is assigned as the node state 114 or severity level for the node 110. In this manner, a change control status is provided for the node 110.

The four exemplary severity levels include: (1) OK (e.g., green color displayed on a node states GUI screen 113); (2)

warning, some differences observed (e.g., yellow color); (3) "fail" (i.e., potential node failure, serious differences observed) (e.g., red color); and (4) test not run (e.g., blue color, where the node 110 could not be accessed through the network 32 of FIG. 1, or where one or more of the programs of the system 2 were unable to execute). The node states 114 for each of the monitored nodes are available to the program sppview 38 for display on its GUI 39 of FIG. 2.

Each platform which employs the program sppcheck 40 displays a "fail" status screen (not shown) when the user logs onto that platform in its "fail" state. For example, no quality assurance work may be performed on any platform that is in the "fail" state. Also, the "fail" status screen is displayed as soon as the "fail" severity difference from the platform's template is detected. Another screen (not shown) is displayed once the "fail" severity difference has been resolved. A message corresponding to the message displayed on the "fail" screen is suitably sent to the administrator 50.

Finally, the program sppreport 42 periodically reviews the log file 116, places log data into a node metrics collection file 122, and summarizes the results in the exception report 118. The log file 116 is periodically summarized to demonstrate system sameness (e.g., for quality assurance records), to identify recurring problems, and to be compact, yet report all errors (e.g., if a file has its permission and length changed, then the current and reference values should be displayed along with the file name and date/time of checking initiation). The file 122 is preferably reduced to the last, for example, seven days of data.

In this manner, the system 2 of FIG. 1 detects changes that can indicate that a product has changed by some event in the computer system 4. One remedy might be to re-install and re-customize the product. The system 2 may restore that product to its original status and, thus, perform a selective install of only the affected pieces of a product independent of the product's installation procedure. This feature minimizes the actual restoration time and any additional customizing that might be necessary to restore the product to its original status.

Figure 7:
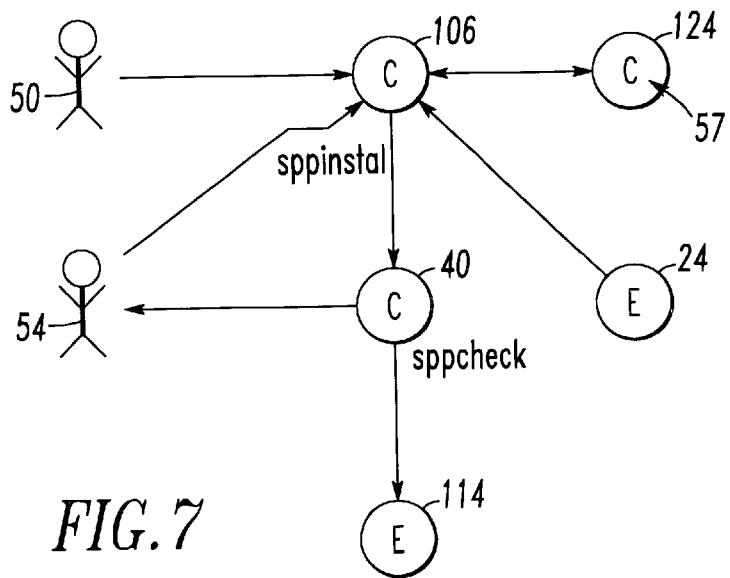

FIG. 7 shows the program sppinstal 106 which is installed on the monitoring node 22 of FIG. 1 and which works in conjunction with the program sppcopy 57 of FIG. 2 on the target node 124. First, the help desk person 54 or administrator 50 logs onto the monitoring node 22 and starts the installation process by executing the program sppview 38 of FIG. 2.

Scheduled synchronous and asynchronous activities are initiated by the daemon 112 which also serves as the communication interface to the network 32 of FIG. 1. Scheduled checking of a particular monitored node 6,8 is performed by the program sppcheck 40 which is initiated via a user specified schedule that the daemon 112 employs. Either fast and/or full checks may be performed multiple times a day depending upon user specifications. For example, a repeat cycle may be specified in days or hours. Alternatively, checks may be scheduled at specific times of the day.

The daemon 112 also causes periodic exception reports to be created only a monthly or quarterly basis. Checking or reporting are initiated immediately when scheduled events have been missed (e.g., this can occur if the node has lost power). The daemon 112 also initiates file transfers from remote nodes and will retry these at user specified intervals until they are successful (e.g., in the event that the remote node is temporarily unavailable).

The program sppcheck 40 can also be initiated on-demand, at any time, (e.g., through GUI or from a command line) to perform a test regardless of the above selection of the scheduled testing.

The program sppinstal 106 reads the target node configuration 124 and installs the appropriate system 2 files and programs. These always include the program sppcheck 40 and program sppreport 42 of FIG. 2, and the state check list 120 and node specific state data 114 of FIG. 6. Also, the program sppview 38 of FIG. 2 will only be loaded to a help desk/administrator node. The program 40, in turn, confirms the installation, produces the node specific state data 114, and produces a diagnostic message to the help desk person 54 to indicate a successful check. This diagnostic message indicates the number of individual tests that were performed.

The templates may be checked by the program 40 on a daily basis (e.g., in the exemplary embodiment, between one to four times on monitored nodes dependent upon the parent organization's quality assurance requirements), although a wide range of times are possible. A "full-recheck," which calculates the modified CRC, requires from 10 to 45 minutes in typical applications. These rechecks are performed in the background along with other monitoring functions. A "fast-recheck" may be executed from the monitoring node 22 of FIG. 1 to obtain a rapid, but less detailed, assessment of any monitored node. These rechecks require about 5 to 25 seconds in typical applications and are a key tool for the help desk person 54.

The program 40 may also be employed to identify changes to previously installed products caused by the subsequent installation of other products. For example, if a newly installed product overwrote a file or changed an attribute, then this change may be detected. As another example, when shared libraries are changed, a number of products which share such libraries may be impacted. The program 40 may monitor all libraries and, thus, all products potentially affected by any library change. Furthermore, the GUI 39 of program sppview 38 displays the products names of those products potentially affected by a shared library. As another example, undetected changes to a dynamic linked list (DLL) might have various system impacts. If an executable file (e.g., .exe file) uses a DLL and the DLL is erroneously deleted, then problems would result. Also, if a DLL is changed, there might be several executable files that are adversely affected.

The system 2 of FIG. 1 determines the effects on the computer system 4 from the installation of a product. Running the system 2 after a new product installation validates that the current product installation was performed correctly and checks that the other system products have not been changed. This feature warns administrators of potential problems with product performance for products that were previously on the system.

Figure 8:
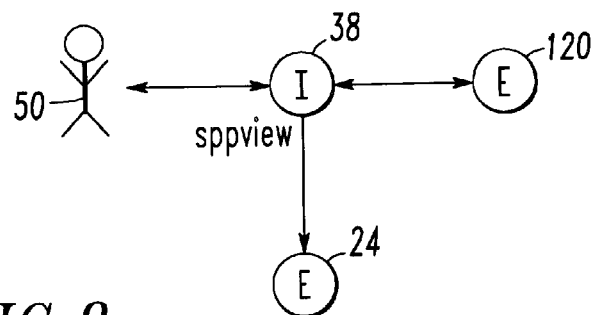

FIG. 8 shows the program sppview 38 through which the administrator 50 provides the information for a new node or upgrades information for an existing node. First, the administrator 50 causes the program sppview 38 to be activated through the GUI 39 of FIG. 2 (e.g., by clicking on an icon or by entering "sppview" from a command line). The GUI 39 of program 38, in turn, causes its main menu to be displayed. From that menu, the administrator 50 selects the administration mode and, in turn, the configuration category from a pull down menu with a list of configuration options. Those options, for example, include: (1) specification of the name assigned to a group of nodes from a node list; (2) specification of the address (e.g., IP address) of the node on the network 32 of FIG. 1 from the node list; (3) names of nodes that act as the basis for node replication via the node list; (4) name of the directory for shared templates and the name of the directory for node specific templates; (5) names of nodes having specific license servers, in which the node name and the license server process are supplied; (6) repetitive date/time(s) for state checking; (7) specification of default severity levels by object type; (8) standard comments for logging; (9) the interval for log condensation concurrent with "exception report" generation; (10) time interval trigger for system/event log entry of uncorrected detected faults; (11) the directory on the target node to be used by the system 2, with the default being "adm/node_Name"; and (12) selection of 32 bit CRC checking. A specific GUI screen (not shown) is provided for each of the above configuration options to permit the administrator 50 to provide the necessary information.

After the administrator 50 enters the configuration data for the node(s) by interacting with the GUI screens (not shown) appropriate to the configuration category and supplies the appropriate information, node configuration data for each of the nodes is retained in either the state check list file 120 for the node or in the master repository 24.

Figure 9:
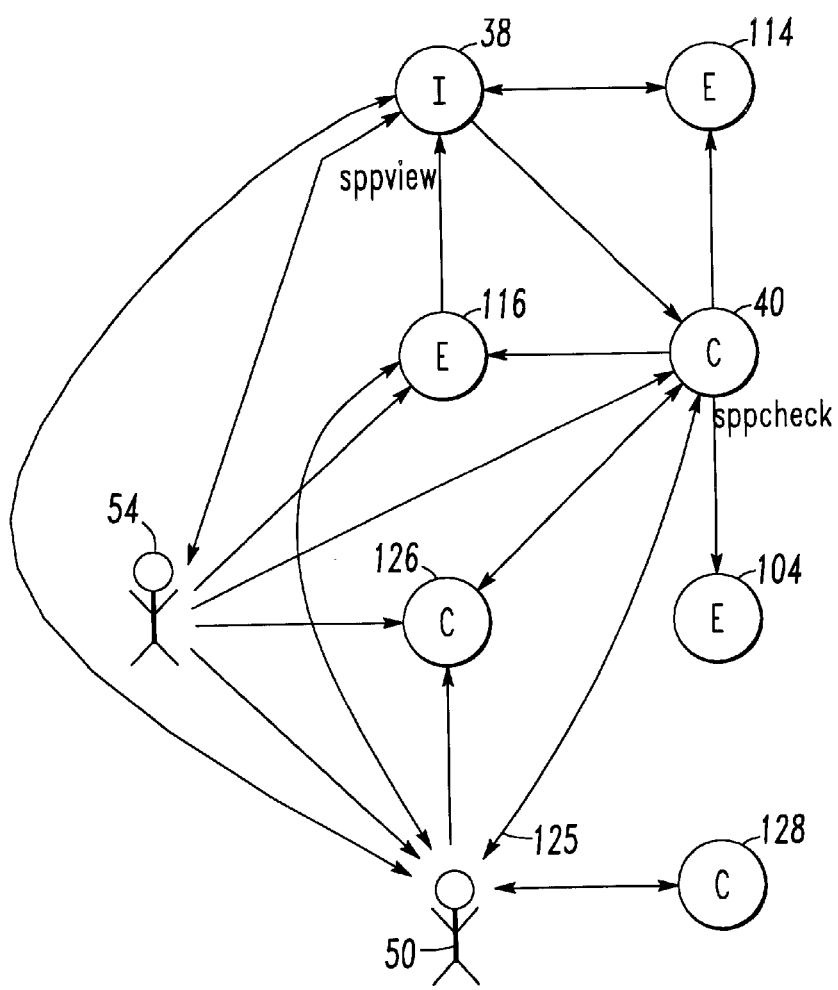

Referring to FIG. 9, the administrator 50 or help desk person 54 identifies a problem and takes corrective action. The system 2, through the various programs sppcheck 40, actively monitors each monitored node on the network 32 via a uniquely defined system schedule. When the system 2 automatically detects a change, an event response is created to alert system personnel of the corresponding system deviation. Alerts are sent, for example, via e-mail, pagers or computer screen and may be sent to a wide range of users and other enterprise personnel.

If two platforms, for example, need to be identical, the system 2 highlights the differences between those platforms and assists the administrator 50 in making such platforms identical via an automated restoration feature. On a controlled platform, the system 2 sends a notification to anyone logged into or attempting to log into that platform when it is not meeting the configuration requirements. It also notifies them when the platform does again meet those requirements. In either case, the administrator 50 receives notification of any failure, while the user only receives notification for controlled platforms.

Still referring to FIG. 9, the program sppview 38 is executed by the help desk person 54 or the administrator 50. In turn, the existence of a certain fault is annunciated by the program 40, for example, by notifying 125 (e.g., by e-mail, pager) the administrator 50, for example, that a certain fault exists. Alternatively, the administrator 50 may identify fault(s) by viewing the test results screen (not shown) of the GUI 39 (shown in FIG. 2) of program sppview 38. In the latter case, the administrator 50 activates the main menu (not shown) of the program 38 (e.g., by clicking on an icon or entering "sppview" on the command line) and selects the monitor option. In turn, the status of the monitored nodes are illustrated on a node states screen (not shown) as discussed above in connection with FIG. 6 in which a four-color code is employed to show the different node states. In turn, a node 126 is selected for review through a select node screen (not shown).

The node state 114 of the selected node 126 was last determined by program sppcheck 40 as initiated, for example, by the user or the daemon 112 as discussed above in connection with FIG. 6. In turn, from the GUI 39, the administrator 50 obtains the current state of the selected node 126 from a sortable list of all nodes in the node group including the current status and time of last verification by program 40. Next, the administrator 50 selects a view product screen from a select node screen (not shown) which causes the status of each failed product to be displayed on the GUI 39. Details of the differences for failed products found by the program 40 are displayed. In this manner, each of the products has a change control status which is updated by the program 40.

The administrator 50, then, diagnoses the problem by reviewing the log file 116 which is displayed by selecting a product log screen (not shown) from the GUI 39. The administrator 50 corrects the problem by executing a correction program 128 (e.g., from the product log screen or by a command entered to the operating system). The help desk person 54 may also execute the program 128 if sufficient access rights were granted or, alternatively, may call or page (e.g., by selecting notify administrator from the product log screen) the administrator 50 to request performance of that action.

The reference state 104 for the selected node 126 may be updated by selecting a commit option from the product log screen. The administrator 50 enters a description of the correction (e.g., by employing a pull down list of standard explanations) via a commit screen (not shown), along with the date, time, and that person's name. In turn, that information is entered in the log file 116. Ultimately, the user is notified of the correction and the application is re-attempted on the selected node 126. Next, the program sppcheck 40 is executed to confirm the correction.

During resolution activity, the administrator 50 "drills down" to the affected area and makes a determination of whether a change is correct. If the change is acceptable, the administrator 50 documents the reasoning. On the other hand, as discussed above, the administrator 50 restores the affected platform to its original state and documents the cause and remedy of the problem. In either event, the system 2 logs the activity along with the administrator's reasoning that the change is correct or that a platform was restored by taking certain action to correct a problem caused by certain events. In turn, the log files 116 permit other personnel to view system changes performed over time.

Figure 10:
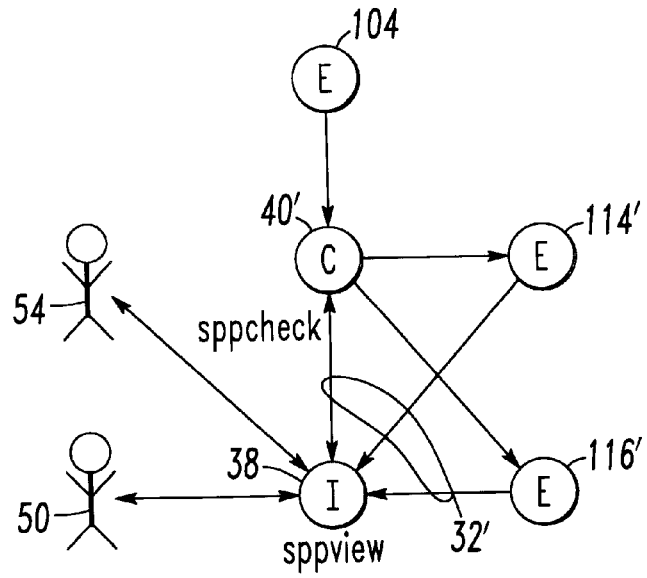

FIG. 10 shows a remote computer system which is accessed by the help desk person 54 or the administrator 50 by employing the remote interprocess communication capability of the communications network 32'. First, the program sppview 38 is executed by, for example, the administrator 50 on the administrator's workstation. Next, the remote program sppcheck 40' is executed on a remote platform (not shown) by employing the remote interprocess communication capability of the network 32'. The program 40' returns information to the program 38 and stores the remote node state file 114' and the remote node log file 116' on the remote platform. The program sppview 38 is employed to select node(s) and the options to be employed by the program sppcheck 40', with the files 114',116' being remotely accessible by the program sppview 38 over the network 32'. In turn, execution of the program 40' may be terminated by selecting a stop check option from the GUI 39 (shown in FIG. 2) of program 38.

Figure 11:
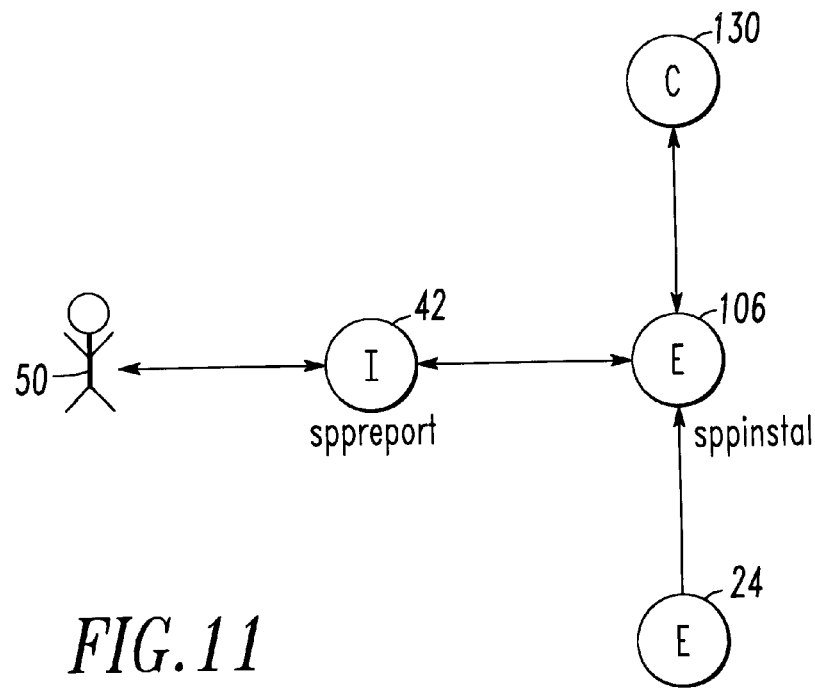

FIG. 11 shows a software identification function which is provided to audit the computer system 4 of FIG. 1 and to determine which products are installed thereon. All product templates in specified directories of the repository node 24 of FIG. 1 are compared against the files resident on the target node 130 in order to identify the products residing on that platform. Next, the program sppinstal 106 searches all of the directories on the node 130 and tests file names, file lengths and directory structures (e.g., CRC matching may be ignored) to determine if a product (or a portion of a product) is present.

In turn, all matches are saved in a file for access by the program sppreport 42 which, then, correlates the matched fields. For each product, the product name, the number of files detected, the expected product version as determined from the product template, and the number of files expected are displayed. In this manner, a product view of the platform is obtained as contrasted with a view of the file structure. Finally, an inventory report may be obtained for each node in a group of nodes. An important aspect of this function is the capability to analyze "guest" nodes and potential unauthorized user installations of products. For example, by providing a count of product copies on each of the platforms of the computer system 4, compliance with software site licenses, in which a maximum number of software product uses is authorized, may be ensured.

Figure 12:
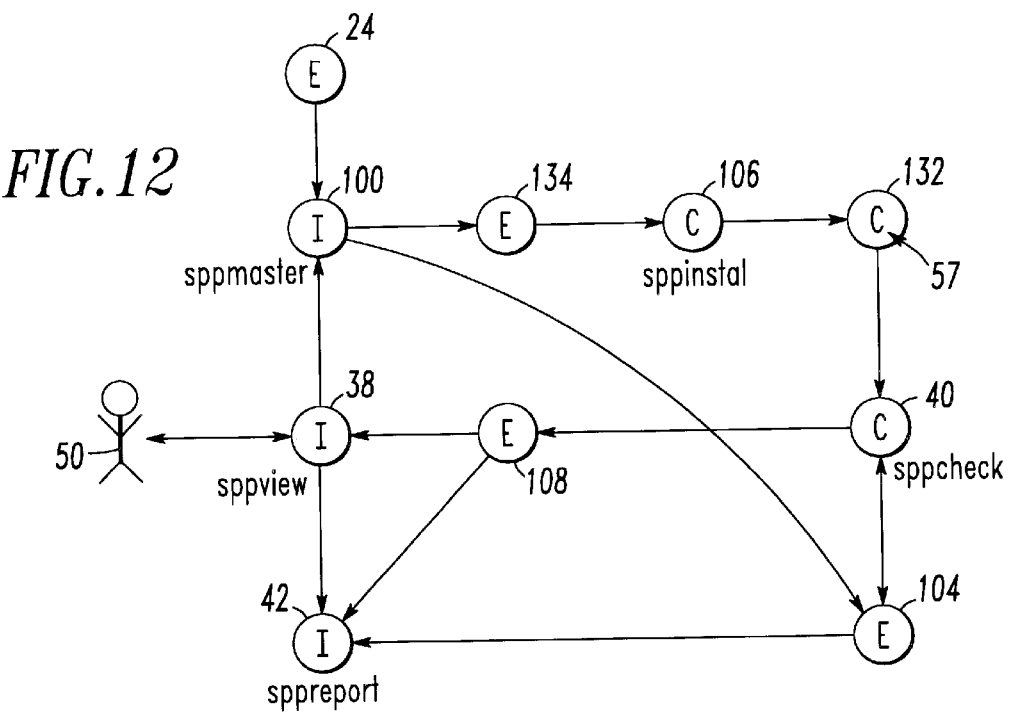

Referring to FIG. 12, the administrator 50 employs the program sppview 38 to duplicate the software configuration of one node as stored in the repository 24 to an identical hardware node 132. From the main menu (not shown) of the program sppview 38, the administrator 50 specifies that an existing node configuration is to be copied by successively selecting the administrator and replicate node options. The administrator 50 selects the node to be replicated from the replicate node screen (not shown) and requests installation. Since the hardware and software on the pre-configured node and the replicated node 132 are identical, no further administrator actions are required. Next, program 38 invokes program sppmaster 100 which copies the check list and all of the required state files for the existing node from the repository 24 to a monitoring directory 134 of the target node 132. Then, the program sppinstal 106 and program sppcopy 57 install a duplicate state configuration on the target node 132.

The program sppcheck 40 is executed and generates reference data for those elements (e.g., node name, communications network address) which are expected to change between the pre-configured node and the replicated node 132. The reference data is stored in the node specific state reference file 108. The program 40, which is driven by the data from the replicated node 132, also checks the state of each element and confirms that the installation matches the reference state attributes 104 for node 132.

In turn, the administrator 50 reviews the results from the program sppview 38. The administrator 50 selects an initial QA option which causes several of the available reports (e.g., state configuration, access, node specific templates) to be generated and, then selects the reports option from the select product screen (not shown), obtains a list of the available reports, and accesses a summary report from program sppreport 42 which describes the initial state of the node 132. After the software installation, the administrator 50 verifies the installation, with any differences required to match the reference node 26 of FIG. 1 being resolved and documented as discussed above in connection with FIG. 9. In this manner, the administrator 50 may install a change to one or more of the platforms (e.g., 1000's of platforms) of the computer system 4 and determine that the change(s) installed correctly.

The various template distribution functions are supported by dialogs that: (1) distribute a template to a node and, thus, create duplicate platforms; (2) construct a template from a set of available products; and (3) change owner, group, and permissions for multiple products (e.g., which is of import for the initial distribution of the products). The second construct template function may: (a) permit each monitored node to have a unique set of products; (b) change the products included in the template for a node (e.g., add products, remove products); and (c) change schedules and e-mail notification.

In this manner, master nodes are employed to create replicate nodes, or to replicate single products to another node. For example, the administrator 50 may choose to create both: (a) a master node and a user node, or (b) a user only node. A Nmaster node is a node that has been configured correctly and verified, and, thus, may be used to create a replicate node or to duplicate a single product. The former option creates a master node that other nodes may use as the source of files and templates. In the latter option, a user only node is modeled after a master node and, thus, may change over time with the addition and removal of products.

Figure 13:
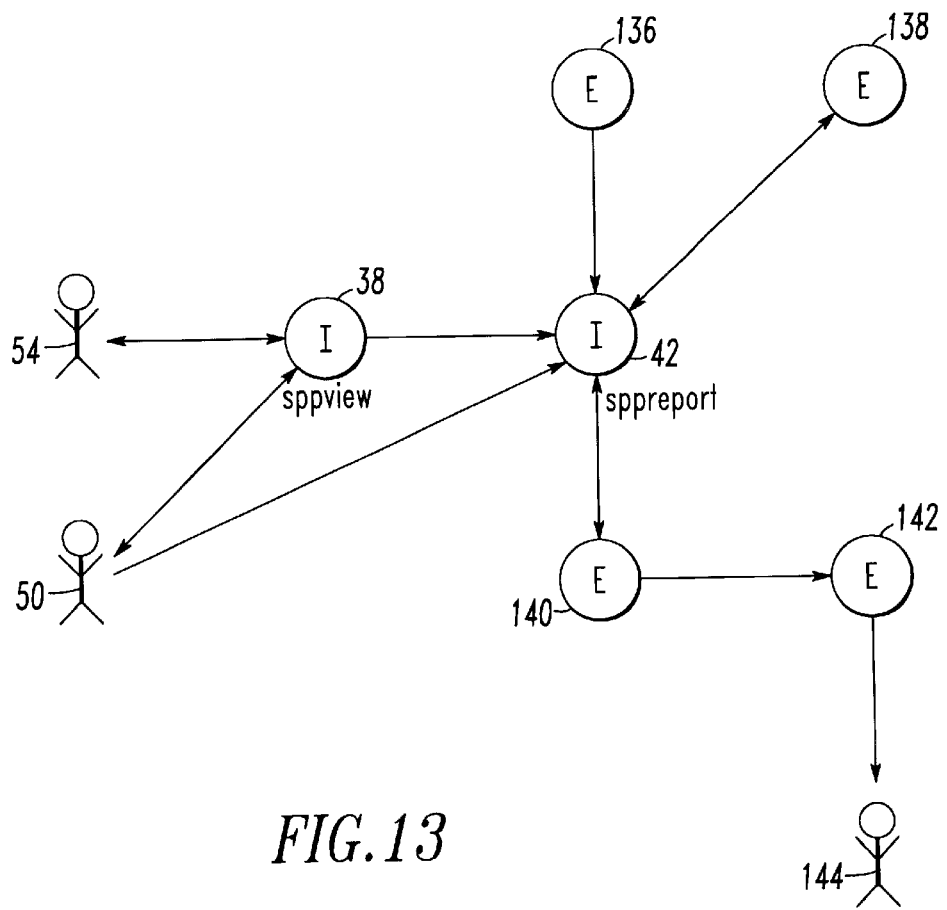

FIG. 13 shows the production of reports to identify trends or support audits regarding activity on one or more nodes of the computer system 4 of FIG. 1. The help desk person 54 or the administrator 50 (or perhaps an auditor 144) executes the program sppview 38 which, in turn, invokes the program sppreport 42. Alternatively, these personnel invoke the program 42 directly on their platform by entering "sppreport" on the command line along with the selection of one or more reports such as, for example, product set report; master product set report; product inventory report; product testing report; state report; access report; exception report; current log report; product QA report; initial node QA report; and/or system metrics report (which causes the state report, the product testing report, and the appropriate product QA reports to be generated) for one or more of the monitored nodes 6,8 of FIG. 1.

In the client-server architecture of the exemplary system 2 of FIG. 1, program sppreport 42 is a "client" installed on the monitoring node 22 which initiates the report(s) for generation by a corresponding "server" program spprpt (not shown) which is installed on the selected monitored node 6,8. Alternatively, the user may logon to one of the monitored nodes 6,8 and directly generate the report(s) through the program spprpt.

For selection through the GUI 39 (shown in FIG. 3) of program sppview 38, the administrator 50 interacts with the select node screen (not shown) to select the desired node(s) for the report before initiating the report option. Next, the GUI 39 displays the report selection screen (not shown) to the administrator 50 for selection of one or more of the reports as set forth above with the command line option. Since the exemplary system 2 of FIG. 1 is a product in the computer system 4, the product set report will also check and report the quality state of the system 2 product. The product QA report shows, for example, quality assurance logging of template changes.

Preferably, node history logs, such as 136, are condensed as much as possible since they are often retained for a long period of time. For this reason, the GUI 39 of program sppview 38 provides an option to delete the log file 136 once the node metrics collection file 138, such as a monthly history record, is produced. As the log files 136 can get quite large, periodically, those detailed logs are summarized into more concise summary reports, such as 138, to provide the same information in condensed form. These summary reports are crucial to defending computer system activity over time.

Next, the options for the specific report(s) are displayed through the GUI 39 of FIG. 2 and the administrator 50 selects those options from the report selection screen (not shown). The administrator 50 invokes report generation from the GUI 39 and the program 42 generates the desired report(s) 140. All of the reports 140 may be selected for viewing at the GUI 39 via program sppview 38, printing to a printer 142, or printing to a file via the report selection screen (not shown).

By selecting multiple nodes, a summary report may indicate, for example, that nodes "1–17" are OK, while nodes "18–20" have failed. In this manner, the reports 140 provide system evaluation for the user rather than by user. Moreover, the reports 140 provide a complete chronological history of change control and problem resolution activity for the computer system 4.

The reports 140, which are based on the log files 136, may be employed to defend the quality status of the computer system 4 during its operation. These records are crucial to support audits that need to determine if the platforms and products were operating in a controlled environment during a specific time period. In turn, the auditor 144 may review selected reports 140. For example, the auditor 144 may have permission to generate reports, but would not have permission to modify the system 2.

The system 2 is very valuable in a strict configuration environment. The logs, archive files, and the report generator satisfy all of the system history documentation requirements in an audit. The monitoring ability ensures that the Validation & Verification (V&V) environment is not corrupted and the "node replication" enables the addition of new platforms without any more V&V. The combination of performing all of the V&V on the reference node 26 of FIG. 1 and then running the corresponding programs only on replicate nodes ensures consistent computation by such programs.

Several types of audits are performed on an ongoing basis. Internal audits are conducted to ascertain that the configuration control is maintained. Customer audits are performed to assure that results prepared for them were performed by validated programs on properly configured platforms. Nuclear Regulatory Commission (NRC) audits are performed to confirm that appropriate configuration control has been exercised. The summary reports 140 that are prepared on a scheduled basis (e.g., monthly or quarterly) are designed to satisfy the above audit requirements. In addition, auditors, such as 144, may review the product logs and system log that are maintained on each computational node.

The exemplary system 2 ensures that critical computing components remain unchanged in dynamic computing environments. As such environments are changing at an ever increasing rate, the system 2 demonstrates that the computing capability is in a suitable quality assurance state and supports changes to these environments at low risk. The system 2 may be employed to show that a computer system is identical to its validation system and, thus, demonstrate proper configuration control.

The system 2 provides benefits in both problem avoidance and problem resolution. It supports problem avoidance by ensuring that the target platforms are configured to accommodate software that is being "rolled out". This, in turn, reduces the number of support calls that a central help desk facility receives and also reduces customer dissatisfaction. For example, evidence that platforms used for nuclear safety are in quality assurance compliance reduces audit costs and avoids costly penalties. Furthermore, the identification of corrupted files eliminates the "sleuth" stage of problem resolution which is often the most costly component of the problem resolution process. Rapid identification of corrupted files moves many problems into a 5 to 10 minute resolution time period which can readily be handled by a help desk. Also, this reduces the number of problems passed to upper level support personnel.

A significant benefit of the exemplary system 2 that can be demonstrated to an auditor is the high degree of control and quality assurance that can be performed with minimal cost. Once the system 2 is established on the computer system 4, continuous monitoring alerts system personnel of changes. The administrator can go onto other activities knowing that the system 2 can detect system problems before users are affected by them. Furthermore, questions regarding system quality assurance can easily and quickly be answered by the system 2. These benefits provide significant cost savings in terms of system reliability, system maintenance, system administration, user productivity and management time in system problem resolution. The primary benefits of the system 2 are derived from the ability to monitor, diagnose and remedy system problems quickly. Additional benefits of the system 2 include an increased level of quality assurance control for the computing environment and the ability to monitor the computer system 4 in a mixed (e.g., NT and Unix) environment.

Benefits associated with the concepts of extended quality assurance space and problem diagnosis are substantial and can easily outweigh the primary ones. With the system 2 installed and configured to periodically check the computer system 4 (e.g., four times per day), the time at risk caused by an undiscovered quality assurance related system change can be minimized. Furthermore, this window may be further reduced by more frequent periodic monitoring or verification may be done on demand. Users and administrators are notified of changes to their computing environment as they occur, so that corrective or explanatory actions can be taken before a significant number of hours are lost performing calculations on a non-compliant system.

By using the system 2 to replicate operating systems throughout the communications network 32, the validation step can be eliminated from the replicated system. Furthermore, the system 2 is particularly well-suited for remote system administration and troubleshooting. The system 2 may define an extended quality assurance space that encompasses any number of installed platforms. Once one platform is under the control of the system 2, it may be used as a reference against which installations are compared, making it possible to deploy any number of replicates of the reference platform.

The system 2 tracks changes in controlled computing environments. Computer system environment change is automatically detected and information alerts are provided to system personnel via several media. All computer system activities are logged to provide traceability of changes. For example, reports with sufficient detail to satisfy NRC nuclear safety audits are produced.

The system 2 automatically performs the following tasks providing unique system management capabilities: (1) monitors any attribute of any file on any platform on a communications network; (2) monitors any platform from any other platform; (3) monitors any product on any platform; (4) logs computer system change control activity; (5) alerts system personnel of any system deviation; (6) creates a quality assurance record of system activities acceptable for the NRC including a complete chronological history of computer system change control and problem resolution activity; (7) restores any product and its files and attributes to their original status; (8) provides engineering system control; (9) determines the effects to a computer system caused by a product installation; (10) identifies which products are installed on a system and their version; (11) validates that a change installed correctly; (12) performs a scheduled verification of any product; (13) determines when a product has been modified and fully describes the change to that product; and (14) guides an administrator through the process of reviewing computer system deviations and their resolution.

While for clarity of disclosure reference has been made herein to the exemplary GUIs 37,39 and printer 142 for displaying or outputting information, it will be appreciated that such information may be stored, computer modified, or combined with other data. All such processing shall be deemed to fall within the terms "display" or "displaying" as employed herein.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A change monitoring system for a computer system having a plurality of platforms and a plurality of products, said products including a plurality of objects, said objects having a plurality of attributes, said attributes having a plurality of values, said change monitoring system comprising:

means for creating and managing a plurality of templates representative of said computer system, said templates including a plurality of expected values for the values of the attributes of the objects of said products;

means for storing said templates;

means for communicating with said platforms of said computer system;

means for associating said templates with corresponding ones of said platforms or said products; and means for monitoring said computer system for changes to the values of the attributes of the objects of said products with respect to the expected values of said templates.

2. The change monitoring system of claim 1 wherein said objects of said platforms are selected from the list comprising CPU type, operating system version, operating system release, and disk storage.

3. The change monitoring system of claim 1 wherein said means for communicating is a communications network.

4. The change monitoring system of claim 1 wherein each of said platforms includes a plurality of files each of which has a plurality of attributes; and wherein said means for monitoring said computer system includes means for monitoring said attributes.

5. The change monitoring system of claim 1 wherein each of said platforms has a change control status; and wherein said means for monitoring said computer system includes means for determining said change control status of said platforms.

6. The change monitoring system of claim 5 wherein said means for storing said templates stores one of said templates for each of said platforms; and wherein said means for creating and managing includes means for displaying a difference between one of said platforms and a corresponding one of the templates.

7. The change monitoring system of claim 6 wherein said means for determining said change control status includes means for notifying a user of said difference.

8. The change monitoring system of claim 1 wherein said means for creating and managing includes means for creating one of said templates for a plurality of said platforms.

9. The change monitoring system of claim 8 wherein a change is installed to at least one of said platforms; and wherein said means for monitoring said computer system includes means for determining that the change installed correctly.

10. The change monitoring system of claim 1 wherein one of said platforms includes a plurality of said products; and wherein said means for monitoring said computer system includes means for monitoring said products of said one of said platforms.

11. The change monitoring system of claim 1 one of said platforms includes a plurality of directories; and wherein said means for monitoring said computer system includes means for monitoring said directories of said one of said platforms.

12. The change monitoring system of claim 1 wherein at least one of said platforms has at least one of said products installed thereon, with said at least one of said products having an original product state and a modified product state; wherein said means for storing said templates defines the original product state; wherein said means for monitoring said computer system includes means for detecting the modified product state of said at least one of said products; and wherein said means for creating and managing includes means for restoring said at least one of said products to the original product state.

13. The change monitoring system of claim 12 wherein each of said products includes a plurality of files each of which has an original file state and a modified file state; wherein said means for detecting the modified product state includes means for detecting changes from the original file state to the modified file state.

14. The change monitoring system of claim 12 wherein each of said products has a change control status; and wherein said means for creating and managing includes means for displaying said change control status of said products.

15. The change monitoring system of claim 1 wherein said means for creating and managing includes means for displaying one of said templates.

16. The change monitoring system of claim 1 wherein said means for monitoring said computer system includes means for displaying changes to said computer system.

17. The change monitoring system of claim 16 wherein said means for displaying changes to said computer system includes means for filtering said changes for display.

18. The change monitoring system of claim 16 wherein said means for displaying changes to said computer system includes means for creating and displaying a quality assurance record.

19. The change monitoring system of claim 18 wherein each of said platforms has a quality control status; and wherein said means for creating and displaying a quality assurance record includes means for preparing a report including said quality control status of said platforms.

20. The change monitoring system of claim 1 wherein said products include at least one previously installed first product and at least one newly installed second product, which is different than said first product; and wherein said means for monitoring said computer system includes means for identifying changes to said computer system caused by installation of said at least one newly installed second product.

21. The change monitoring system of claim 20 wherein said means for identifying changes to said computer system includes means for identifying changes to said at least one previously installed first product caused by the installation of said at least one newly installed second product.

22. The change monitoring system of claim 1 wherein said products include a plurality of software products installed on said platforms; and wherein said means for monitoring said computer system includes means for identifying said software products which are installed on said computer system.

23. The change monitoring system of claim 22 wherein said means for identifying said software products includes means for providing a count of each instance of one of said software products on said platforms.

24. The change monitoring system of claim 22 wherein each of said software products has a version; and wherein said means for identifying includes means for identifying the versions of said software products.

25. The change monitoring system of claim 1 wherein information related to each of said products is installed on said means for storing said templates; and wherein said means for monitoring said computer system includes means for periodically confirming said products with respect to the installed information of said means for storing said templates.

26. The change monitoring system of claim 1 wherein information related to each of said products is installed on said means for storing said templates;; and wherein said means for monitoring said computer system includes means for nonperiodically confirming said products with respect to the installed information of said means for storing said templates.

27. The change monitoring system of claim 1 wherein said platforms include files; wherein said templates include file management information; and wherein said means for monitoring said computer system includes means for providing file management control of said platforms.

28. The change monitoring system of claim 1 wherein said platforms include hardware mechanisms; wherein said templates include hardware management information for said hardware mechanisms; and wherein said means for monitoring said computer system includes means for providing hardware management control of said platforms.

29. The change monitoring system of claim 28 wherein said hardware mechanisms include a disk having at least one of a disk quota, a disk map and a disk mount; and wherein said means for providing hardware management control includes means for monitoring at least one of said disk quota, said disk map and said disk mount.

30. The change monitoring system of claim 1 wherein said templates include a list of the expected values for the values of said attributes; and wherein said means for monitoring said computer system includes means for comparing the values of said attributes with the expected values of said list.

31. The change monitoring system of claim 1 wherein each of said platforms includes a plurality of processes each of which has a plurality of attributes, the attributes of said processes having a plurality of values; wherein said templates include a plurality of expected values of the values of the attributes of said processes; and wherein said means for monitoring said computer system includes means for monitoring the values of the attributes of said processes for changes with respect to the expected values of the values of the attributes of said processes of said templates.

32. The change monitoring system of claim 1 wherein one of said templates is associated with a Windows NT™ registry entry.

33. The change monitoring system of claim 1 wherein one of said templates is associated with a running service or daemon.

34. The change monitoring system of claim 1 wherein one of said templates is associated with computer handshaking between said platforms.

35. A change monitoring system for a computer system having a plurality of platforms and a plurality of products, said platforms and said products include a plurality of attributes each of which has a value, said change monitoring system comprising:

means for creating and managing a plurality of templates representative of said computer system, said templates include a list of expected values for the values of said attributes;

means for storing said templates;

means for communicating with said platforms of said computer system;

means for associating said templates with corresponding ones of said platforms or said products; and means for monitoring said computer system for changes to said platforms or said products with respect to said templates, said means for monitoring said computer system includes means for comparing the values of said attributes with the expected values of said list, wherein said list includes a severity value for each of said expected values, said severity value being associated with divergence of a corresponding value of said attributes from a corresponding expected value of said list; and wherein said means for comparing the values of said attributes with the expected values of said list includes means for identifying each of said attributes and the corresponding severity value for each instance of said divergence.

36. The change monitoring system of claim 35 wherein said severity value is associated with a plurality of severity levels which are selected from the list comprising: OK, warning, and fail.

37. The change monitoring system of claim 36 wherein said warning severity level is associated with a first set of differences between the values of said attributes and the expected values of said list, and said fail severity level is associated with a second set of said differences.

38. The change monitoring system of claim 36 wherein said severity levels are associated with said products.

39. The change monitoring system of claim 36 wherein said severity levels are associated with said platforms.

40. The change monitoring system of claim 35 wherein said products include a plurality of objects; and wherein each of said objects has a default severity level.

41. A change monitoring system for a computer system having a plurality of platforms, said platforms include at least one platform having a first operating system and at least one platform having a second operating system which is different than said first operating system, said change monitoring system comprising:

means for creating and managing a plurality of templates representative of said first and second operating systems;

means for storing said templates;

means for communicating with said platforms of said computer systems;

means for associating said templates with corresponding ones of said first and second operating systems; and means for monitoring said computer system for changes to said first and second operating systems with respect to said templates.

42. The change monitoring system of claim 41 wherein one of said first and second operating systems has an original state and a modified state; wherein said means for storing said templates defines the original state; wherein said means for monitoring said computer system includes means for detecting the modified state of said one of said first and second operating systems; and wherein said means for creating and managing includes means for restoring said one of said first and second operating systems to the original state.

43. A change monitoring and response system for a computer system having a plurality of platforms and a plurality of products, said products including a plurality of objects having a plurality of values, said change monitoring and response system comprising:

means for creating and managing a plurality of templates representative of said computer system, said templates including a plurality of expected values for the objects of said products;

means for storing said templates;

means for communicating with said platforms of said computer system;

means for associating said templates with corresponding ones of said platforms or said products;

means for monitoring said computer system for changes to the values of the objects of said products with respect to the expected values of said templates; and means for responding to said changes to said values of the objects of said products with respect to said templates.

44. The change monitoring and response system of claim 43 wherein at least one of said products has an original product state and a modified product state; wherein said means for storing said templates defines the original product state; and wherein said means for responding includes means for restoring said at least one of said products to the original product state.

45. The change monitoring and response system of claim 44 wherein said means for restoring includes means for manually restoring said at least one of said products.

46. The change monitoring and response system of claim 44 wherein said means for restoring includes means for automatically restoring said at least one of said products.

47. The change monitoring and response system of claim 43 wherein said means for responding includes means for notifying a user of said changes to said platforms or said products.

48. The change monitoring and response system of claim 47 wherein said means for notifying a user of said changes includes a plurality of notification types for said products.

* * * * *